|# United States Patent

[11] 3,572,869

| [72] | Inventors | Robert A. Studinski;<br>Florian A. Walter, Aurora, Ill. |
|---|---|---|
| [21] | Appl. No. | 871,039 |
| [22] | Filed | Sept. 29, 1969<br>Division of Ser. No. 697,490, Jan. 12, 1968,<br>Pat. No. 3,521,935 |
| [45] | Patented | Mar. 30, 1971 |
| [73] | Assignee | Lyon Metal Products Incorporated<br>Aurora, Ill. |

[54] MOUNTING ASSEMBLY
4 Claims, 11 Drawing Figs.

[52] U.S. Cl. .................................................. 312/194
[51] Int. Cl. ............................................ A47b 17/00,
A47b 19/00, A47b 27/00
[50] Field of Search ................................. 312/194,
195, 196, 197; 287/189.36

[56] References Cited
UNITED STATES PATENTS
3,363,955  1/1968  Schreyer .................... 312/194

3,471,211  10/1969  Schreyer .................... 312/194X

Primary Examiner—Paul R. Gilliam
Attorney—Prangley, Clayton, Mullin, Dithmar and Vogel ABSTRACT: The mounting assembly is used for attaching a member to a mounting channel including inwardly directed retaining flanges disposed on the lower edges of a pair of downwardly extending sidewalls. The assembly comprises a threaded nut positioned on the upper surfaces of the retaining flanges, the distance between a pair of longer sides of the nut being less than the distance between the retaining flanges to permit insertion of the nut in the channel, a washer positioned against the lower surfaces of the retaining flanges, the nut and the washer each having abutment surfaces spaced apart a distance slightly less than the distance between the retaining flanges to limit rotation of the nut and the washer, a fastener including a spacer portion and a threaded shank extending therefrom and through the washer and engaging the nut, and an attachment device engaging the fastener for holding the member against the spacer portion.

PATENTED MAR 30 1971

INVENTORS
ROBERT A. STUDINSKI
FLORIAN A. WALTER

Prangley, Clayton, Mullin,
Dithmar & Vogel
ATTYS.

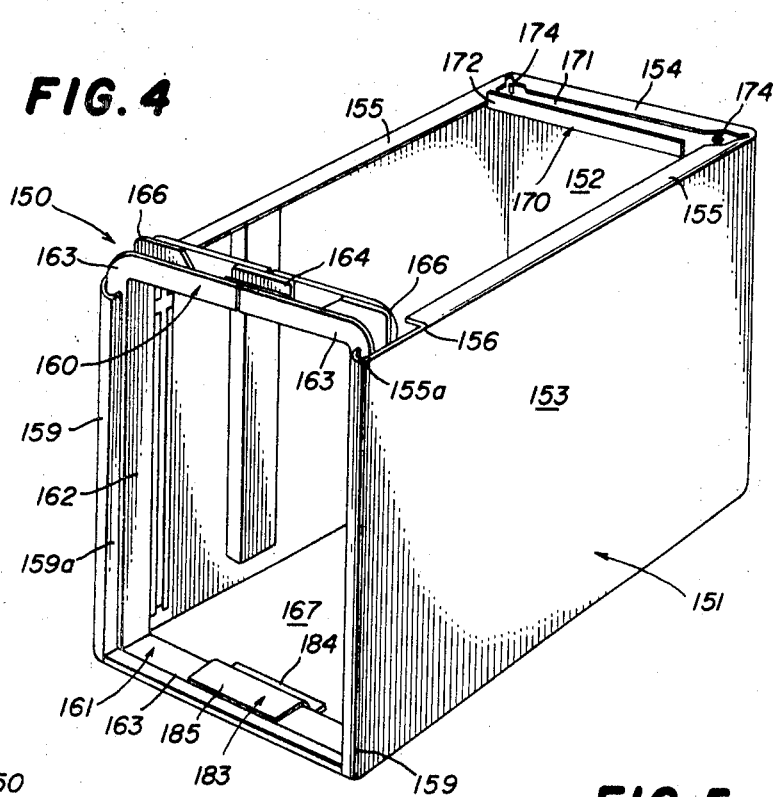
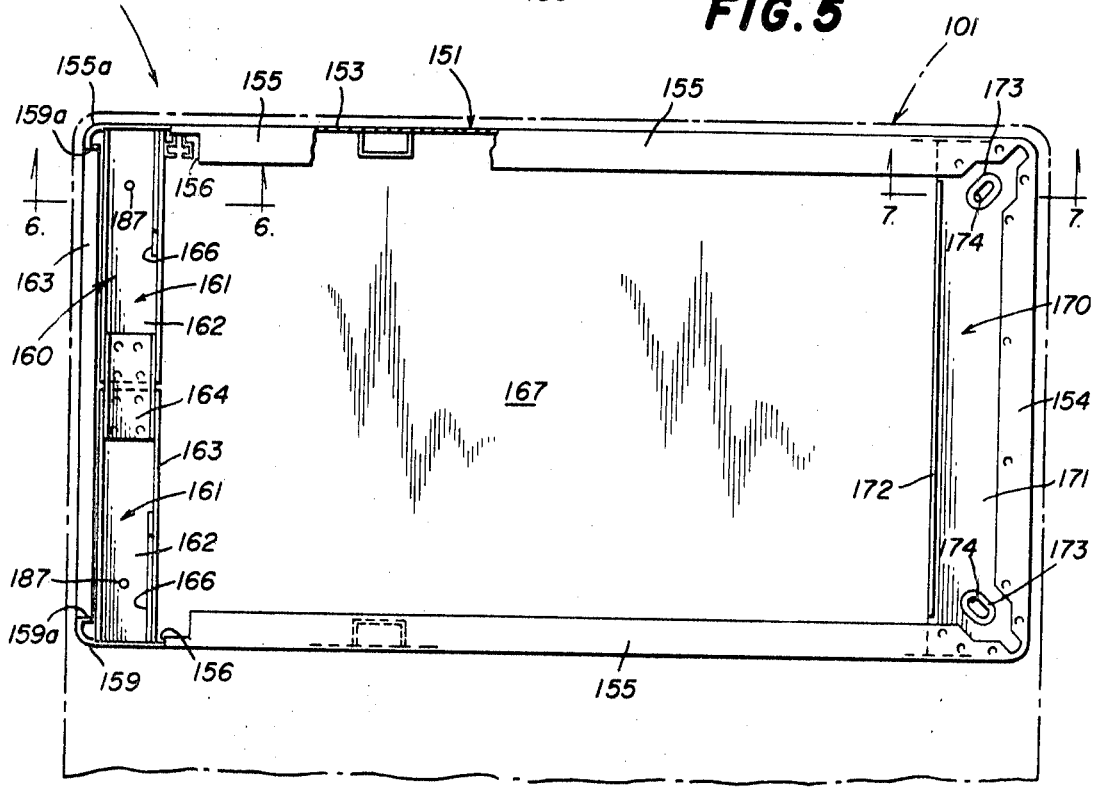
FIG. 4
FIG. 5

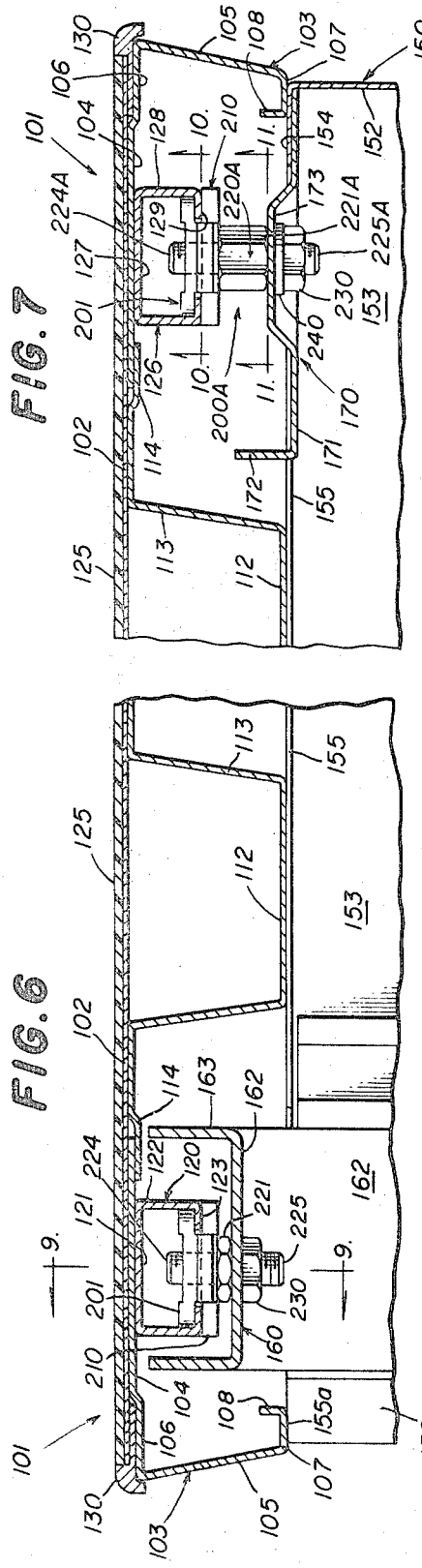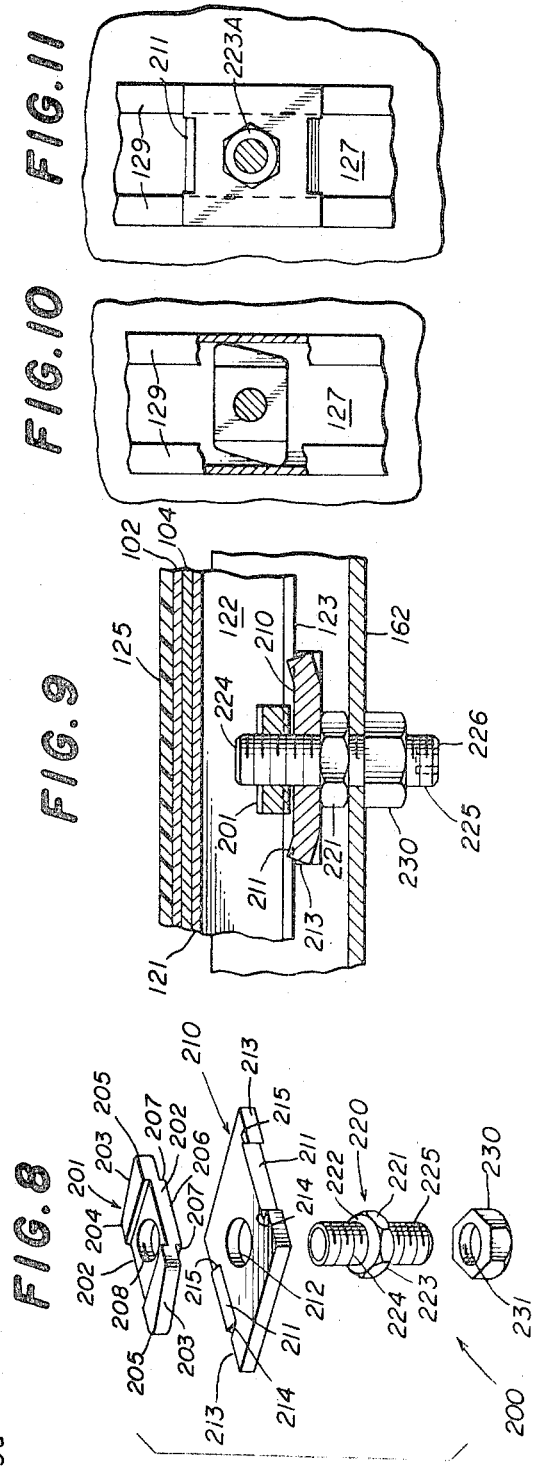

MOUNTING ASSEMBLY

This application is a division of the copending application Ser. No. 697,490, filed Jan. 12, 1968 for MOUNTING ASSEMBLY.

It is a general object of the present invention to provide an improved mounting assembly particularly useful in attaching a member such as a pedestal to a mounting channel.

A further object of the invention is to provide a mounting assembly for attaching a pedestal to a desk top, the parts of which assembly are maintained in a desired orientation while the pedestal is being aligned with the desk top.

In summary, the mounting assembly is used for attaching a member to a mounting channel including a pair of downwardly extending sidewalls having a pair of inwardly directed retaining flanges disposed on the lower edges thereof, the mounting assembly comprising a nut having a threaded opening therein and positioned in use on the upper surfaces of the retaining flanges, the nut having a pair of substantially parallel shorter sides and a pair of substantially parallel longer sides spaced apart a distance less than the distance between the inner edges of the retaining flanges to permit insertion of the nut therein at any place therealong, a pair of downwardly projecting first abutment surfaces on the nut and spaced apart a distance slightly less than the distance between the inner edges of the retaining flanges to permit the first abutment surfaces to be disposed therebetween in an operative position for limiting the rotation of the nut with respect to the channel, a washer having an aperture therein and positioned in use against the lower surfaces of the retaining flanges with the aperture in alignment with the opening, a pair of upwardly projecting second abutment surfaces on the washer and spaced apart a distance slightly less than the distance between the inner edges of the retaining flanges to permit the second abutment surfaces to be disposed therebetween in an operative position for limiting the rotation of the washer with respect to the channel, a fastener including a spacer portion and a threaded shank extending from the spacer portion and positioned in use through the aperture and engaging in the opening, the spacer portion having a pair of engagement surfaces disposed substantially normal to the axis of the shank, and an attachment device engaging the fastener for holding the member against the lower one of the engagement surfaces of the spacer portion, the first and second abutment surfaces retaining the nut and the washer oriented in the operative positions thereof with respect to the channel when the fastener is loosened with respect to the nut, thus to permit adjustment of the position of the member along the channel while maintaining the nut and the washer in the operative positions thereof.

A pair of such mounting assemblies may be provided for use in a desk construction having a desk top, parallel front and rear mounting channels secured to the undersurface thereof and each including a pair of downwardly extending sidewalls having a pair of inwardly directed retaining flanges disposed on the lower edges thereof, a pedestal having a front frame adjacent the forward end thereof and a rear top support adjacent the rear end thereof, the front one of such mounting assemblies being used for attaching the front frame to the front mounting channel and spaced a first predetermined distance therefrom, the rear one of such mounting assemblies being used for attaching the rear top support to the rear mounting channel and spaced a second predetermined distance therefrom, the sum of the first and second predetermined thicknesses respectively of the washer and the spacer portion in the front mounting assembly being equal to the first predetermined distance between the front frame and the front mounting channel, and the sum of the first and second predetermined thicknesses respectively of the washer and the spacer portion in the rear mounting assembly being equal to the second predetermined distance between the rear top support and the rear mounting channel.

Further features of the invention pertain to the particular arrangement of the parts whereby the above outlined and additional operating features thereof are attained.

The invention, both as to its organization and method of operation, together with further objects and advantages thereof, will best be understood by reference to the following specification taken in connection with the accompanying drawings, in which:

FIG. 4 is a perspective view of the pedestal forming a part of the desk of FIG. 1;

FIG. 5 is a top plan view of the pedestal of FIG. 4 and illustrating the desk top in phantom;

FIG. 6 is an enlarged fragmentary view in vertical section along the line 6-6 of FIG. 5 and illustrating the front mounting assembly which connects the desk top and the pedestal front frame;

FIG. 7 is an enlarged fragmentary view in vertical section along the line 7-7 of FIG. 5 and illustrating the rear mounting assembly which connects the desk top and the rear top support of the pedestal;

FIG. 8 is an exploded perspective view of the front mounting assembly of FIG. 6;

FIG. 9 is an enlarged fragmentary view in vertical section along the lines 9-9 of FIG. 6 and illustrating further details of the front mounting assembly;

FIG. 10 is a fragmentary view in horizontal section with certain portions broken away along the line 10-10 of FIG. 7 and illustrating further details of the rear mounting assembly; and FIG. 11 is a fragmentary view in horizontal section along the line 11-11 of FIG. 7 and illustrating further details of the rear mounting assembly.

Figure 1:
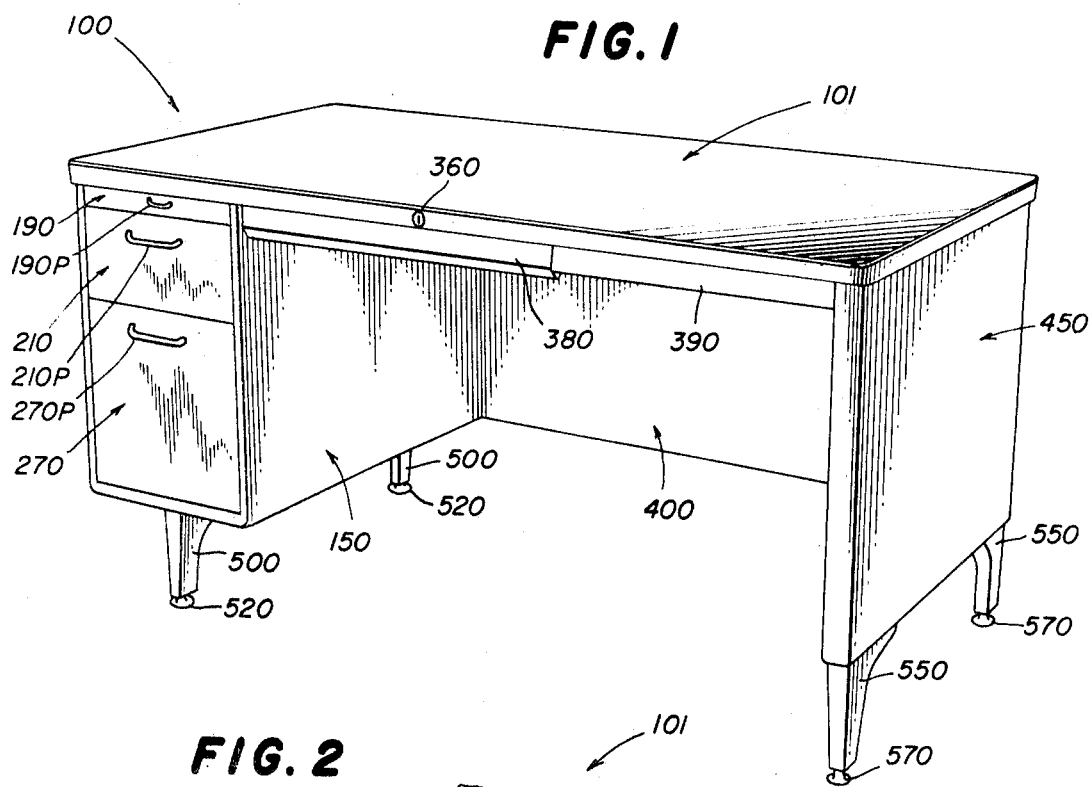
FIG. 1 is a perspective view of a single pedestal desk incorporating therein mounting assemblies constructed in accordance with and embodying the principles of the present invention.

Referring now to the drawings, and particularly to FIG. 1 thereof there is illustrated a piece of furniture made in accordance with and embodying the principles of the present invention, a left-hand single pedestal desk 100 having been shown for purposes of illustration. The desk 100 includes a desk top 101 at one end of which is disposed a pedestal 150 supported by a pair of legs 500 having associated feet 520, the pedestal 150 having mounted therein a shelf 190, a box drawer 210 and a file drawer 270, the shelf 190 being provided with a pull 190P, the box drawer 210 being provided with a pull 210P and the file drawer 270 being provided with a pull 270P. Mounted on the other end of the desk top 101 is an end panel 450 supported by a pair of legs 550 having associated feet 570, the space between the pedestal 150 and the end panel 450 at the rear of the desk top 101 being closed by a back panel 400. There further is mounted on the desk top 101 a center drawer 380 and a depending front wall or skirt 390, a lock 360 being provided in substantially the center of the front edge of the desk top 101 to lock the several drawers 210, 270 and 380.

Figure 2:
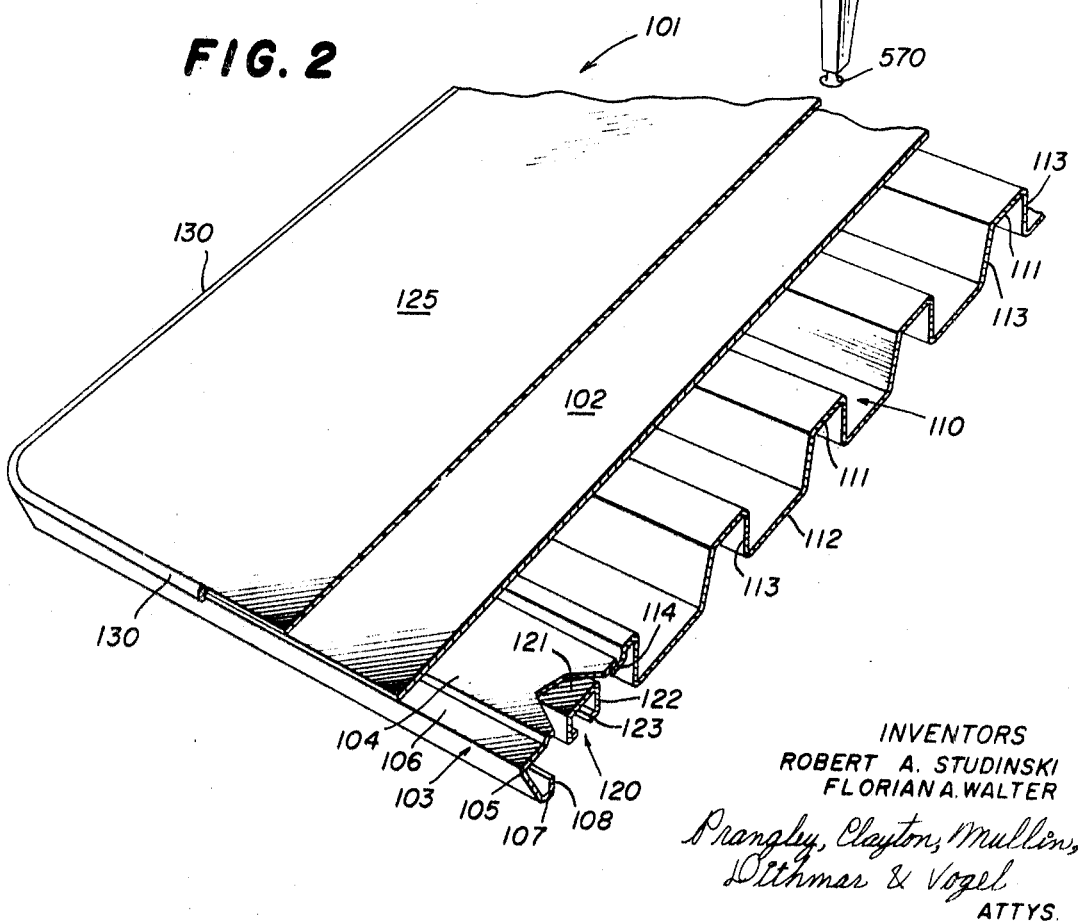
FIG. 2 is a perspective view with certain portions broken away of a corner of the desk top of FIG. 1.
Figure 3:
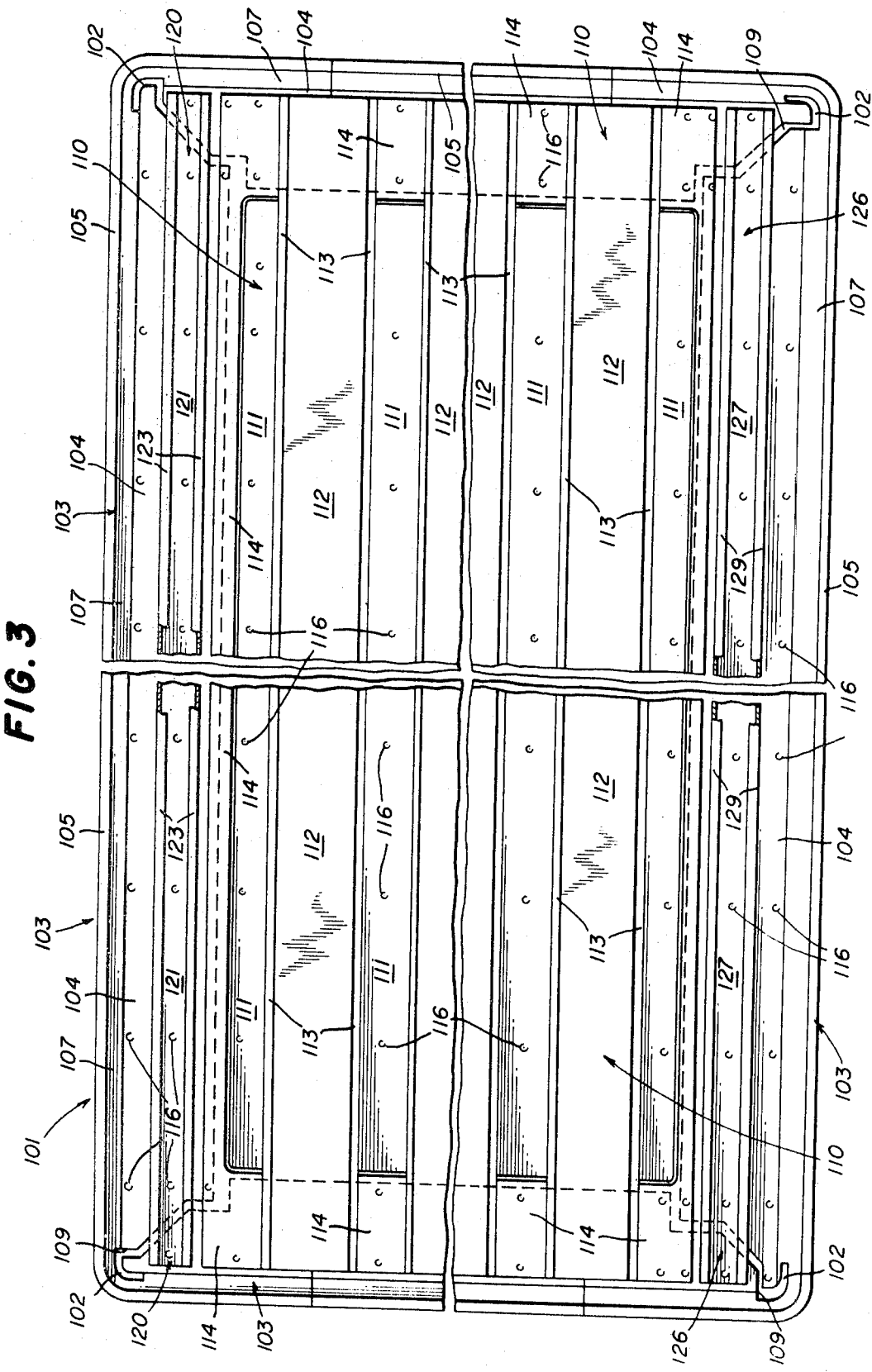
FIG. 3 is a view of the underside of the top of the desk of FIG. 1.

Referring now to FIGS. 2 and 3 of the drawings, additional details of construction of the desk top 101 will be described. The desk top 101 includes a generally flat top plate 102 that is generally rectangular in shape, the corners thereof being rounded, the periphery of the top plate 102 being essentially the same as the periphery of the desk top 101. Disposed on the upper surface of the top plate 102 is a covering 125 preferably formed of a synthetic organic resin. Disposed beneath the top plate 102 and extending around the periphery thereof is an edging 103 also formed of sheet metal, a substantially flat piece of sheet metal having been deformed to provide an attachment flange 104, a side flange 105, a mounting flange 106, a bottom flange 107 and an upturned flange 108. More specifically, the attachment flange 104 is disposed against the underside of the top plate 102 but is spaced inwardly with respect to the outer edge thereof, the outer edge of the attachment flange 104 carrying thereon the mounting flange 106 which is offset downwardly away from the underside of the top plate 102 and extends outwardly slightly beyond the outer edge thereof. As illustrated, the side flange 105 is integral with the mounting flange 106 and depends therefrom and extends slightly inwardly toward the center of the top plate 102, the flange 105 making an angle of for example 75° with respect to the mounting flange 106. The bottom flange 107 is disposed on the lower edge of the side flange 105 and extends inwardly substantially parallel to the flanges 104 and 106 and carries on the inner end thereof the upturned flange 108 that extends upwardly toward the top plate 102 and is disposed substantially normal thereto and to the bottom flange 107. Preferably the edging 103 is formed of two pieces secured to the top plate 102 by welding at the attachment flange 104 and the abutting edges of the edging 103 located substantially at the midpoints of the shorter top sides are also welded to form seams therebetween. By reference to FIG. 3 it will be seen that the attachment flange 104 is cut out as at 109 at the corners of the table top 101 to permit bending of the remaining portions thereof without providing overlapping of the attachment flanges 104.

Also disposed on the underside of the top plate 102 is a reinforcing sheet 110 formed from a substantially flat piece of sheet metal bent to provide attachment portions 111, ribs 112 having side walls 113, and connecting portions 114 at the periphery thereof. The attachment portions 111 are disposed toward the underside of the top plate 102, there being a body of mastic applied therebetween. The attachment portions 111 are further connected to the top plate 102 by welding as at 116, the heat from the welding operation curing the mastic whereby both the mastic and the weld 116 serve to interconnect the attachment portions 111 and the top plate 102 to provide a firm connection therebetween, the mastic also serving to deaden sound transmission therebetween. The side walls 113 depend downwardly from the attachment portion 111 to form the ribs 112 which are spaced from the underside of the top plate 102. The connecting portions 114 are offset from the underside of the top plate 102 to accommodate therebetween portions such as the attachment flange 104 on the edging 103, the three layers mentioned being connected as by welding at 116.

Also mounted beneath the top 101 are two longitudinally extending and substantially parallel and spaced-apart front and rear mounting channels 120 and 126. The front mounting channel 120 includes a longitudinally extending main wall 121 and a pair of downwardly depending sidewalls 122 carrying on the lower ends thereof respectively inturned retaining flanges 123. The rear mounting channel 126 similarly includes a longitudinally extending main wall 127 and a pair of downwardly depending sidewalls 128 carrying on the lower ends thereof respectively inturned retaining flanges 129. As will be explained in detail hereinafter, the other parts of the desk 100 are mounted upon the desk top 101 by means of the front and rear mounting channels 120 and 126.

Referring now to FIGS. 4 and 5 of the drawings, certain details of construction of the pedestal 150 will be described. Referring first to FIG. 4, the pedestal 150 includes a body 151 comprising a substantially rectangular rear wall 152, a pair of substantially rectangular sidewalls 153 extending forwardly therefrom and disposed substantially perpendicular thereto and parallel to each other, the junctions between the rear wall 152 and the sidewalls 153 being rounded for the sake of appearance. The upper edge of the rear wall 152 carries a top rear flange 154, and the upper edges of the sidewalls 153 carry top side flanges 155, the forward edges of the top side flanges 155 being cut out as at 156. The forward edges of the sidewalls 153 carry inwardly curved front flanges 159 that extend substantially vertically and terminate in rearwardly directed flanges 159a, there also being provided top flanges 155a on the upper edges of the curved flanges 159.

Disposed at the forward portion of the pedestal 150 is a front frame 160 which is formed of two substantially C-shaped channels which in turn are essentially U-shaped in cross section each including a main wall 162 and a pair of integral sidewalls 163 extending normal thereto and parallel to each other. The free ends of the C-shaped channels 161 are disposed toward each other and a splice channel 164 is placed in bridging relationship between the abutting upper ends of the channels 161, and a bracket 183 is placed in bridging relationship with the abutting lower ends of the channels 161 and are secured thereto by welding to form the substantially rectangular front frame 160 as illustrated in FIG. 4. There further are provided four L-shaped gusset plates 166 disposed respectively at the four corners of the frame 160 and on the inner side of the rearmost side flange 163 and secured thereto as by welding. The front frame 160 is in turn secured to the pedestal sidewalls 153.

The pedestal 150 further has a bottom wall 167 connected to flanges (not shown) directed inwardly from the pedestal sidewalls 153. The bottom wall is connected to the front frame 160 by means of the front bracket 183, the front bracket 183 including an attachment flange 184 suitably secured to the bottom wall 167 such as by welding and a holding flange 185 that extends upwardly and over the upper surface of the associated channel main wall 162 and is suitably secured thereto as by welding. There further are formed in the top main walls 162 of the front frame 160 openings 187 that receive therethrough fasteners for mounting the pedestal 150 upon the desk top 101 as is shown in FIG. 6, and as will be explained more fully hereinafter.

A rear top support 170 is disposed adjacent to the rear end of the pedestal 150 and includes a body 171 having portions extending under the top rear flange 154 and the top side flanges 155 and suitably secured thereto as by welding. The forward edge of the top support 170 disposed between the inner edges of the top side flanges 155 is provided with an upstanding front flange 172 disposed substantially normal to the body 171. Disposed in the ends of the body 171 and in the corners of the pedestal 150 are upwardly extending embossments 173 having centrally therein elongated openings 174 oriented diagonally with respect to the rear corners of the pedestal 150, the openings 174 being adapted to receive fasteners for the mounting of the pedestal 150 on the desk top 101 as is shown in FIG. 7 and as will be explained more fully hereinafter.

There is illustrated in FIG. 8 of the drawings, the details of an improved front mounting assembly 200 particularly useful in attaching a member such as the pedestal 150 to the desk top 101. Referring now more specifically to FIGS. 6, 8, and 9 the mode of attachment of the front frame 160 of the pedestal 150 to the front mounting channel 120 on the undersurface of the desk top 101 will be described. The front mounting assembly 200 is shown to include a nut 201 having a threaded opening 208 therein and positioned on the upper surfaces of the retaining flanges 123 of the front mounting channel 120. The nut 201 has the outline of an oblique parallelogram with parallel longer sides 202 and parallel shorter sides 203 connected by rounded obtuse corners 204 and rounded acute corners 205. As illustrated, the distance between the sides 202 is slightly less than the distance between the inner edges of the retaining flanges 123, whereby the nut 201 may be inserted therebetween at any point therealong. The diagonal distance between opposing acute corners 205 is greater than the distance between the sidewalls 122 of the front mounting channel 120, whereby the corners 205 are adapted to engage the sidewalls 122 to limit the rotation of the nut 201 with respect thereto.

The underside of the nut 201 has integral therewith, a downwardly depending body portion 206 with abutment surfaces 207 extending substantially normal to the longer sides 202 and spaced apart a distance slightly less than the distance between the inner edges of the retaining flanges 123. In an operative position of the nut, the abutment surfaces 207 are disposed between the inner edges of the retaining flanges 123 and are adjacent thereto to limit rotation of the nut 201 with respect to the channel 120.

The front mounting assembly 200 further includes a washer 210 having an aperture 212 therein, the washer having a substantially square shape with a pair of parallel opposing edges 213 extending normal to the axis of the mounting channel 120. The washer 210 is positioned in use against the lower surfaces of the retaining flanges 123 with the aperture 212 therein in alignment with the opening 208 in the nut 201. Integral with the washer 210 and formed on each of the opposing edges 213 thereof is an upturned projection 211, with the flat ends of one of the projections 211 being aligned with corresponding flat ends on the other of the projections 211 to form upwardly projecting abutment surfaces 214 and 215, which surfaces extend substantially normal to the edges 213 of the washer 210. The abutment surfaces 214 and 215 are spaced apart a distance slightly less than the distance between the inner edges of the retaining flanges 123, whereby in an operative position of the washer 210, such abutment surfaces are disposed between and adjacent to the inner edges of the retaining flanges 123 for limiting rotation of the washer 210 with respect to the channel 120.

Preferably the width of the washer 210 in the direction normal to the axis of the mounting channel 120 is approximately equal to the distance between the sidewalls 122 of the mounting channel 120 to permit the washer 210, in the operative position thereof, to contact a substantial area of the retaining flanges 123, whereby the washer 210 may be constructed of relatively lightweight material. Preferably the distance between the upturned projections 211 exceeds the distance between the shorter sides 203 of the nut 201 in order that the upwardly extending abutment surfaces 214 and 215 of the washer 210 do not interfere with the downwardly extending abutment surfaces 207 of the nut 201, as is more clearly shown in FIG. 9.

The front mounting assembly 200 further comprises a front fastener 220 having a spacer portion 221 with a substantially flat upper engagement surface 222 to engage the lower surface of the washer 210, and a substantially flat lower engagement surface 223. Carried on the upper engagement surface 222 and integral with the spacer portion 221 is an upwardly extending threaded shank 224 adapted to pass through the aperture 212 in the washer 210 and to threadably engage the threaded opening 208 in the nut 201. Carried on the lower engagement surface 223 and integral with the spacer portion 221 is a downwardly extending threaded shank 225 which extends through the opening 187 in the main wall 162 of the front frame 160. The mounting assembly 220 further includes an attachment member in the form of a hexagonally-shaped nut 230 with a threaded opening 231 therein for threadably receiving shank 225.

A hexagonally-shaped recess 226 (FIG. 9) is provided in the lower end of the downwardly extending shank 225 and is coaxial therewith for receiving a similarly-shaped tool to rotate the shanks 224 and 225 of fastener 220. In addition, the spacer portion 221 has a hexagonal periphery to form a gripping surface which also may be used to rotate the fastener 220.

The front mounting assembly 200 just described is used to attach the front frame 160 of the pedestal 150 to the front mounting channel 120 attached to the undersurface of the desk top 101. For the sake of appearance, it is desirable that the top side flange 155a of the pedestal 150 engage the bottom flange 107 of the edging 103 on the desk top 101. To prevent the formation of a depression in the top plate 102 as the pedestal 150 is drawn against the bottom flange 107, it is required that the main wall 162 of the front frame 160 be maintained a predetermined distance from the front mounting channel 120 when the front mounting assembly 200 is tightened. Accordingly, the thickness of the washer 210 and the thickness of the spacer portion 221 along the axis of the threaded shanks 224 and 225 are selected such that their sum is equal to such predetermined distance, whereby tightening of the nut 230 draws the main wall 162 of the front frame 160 tightly against the lower engagement surface 223 of the spacer portion 221 and maintains the distance between the front frame 160 and the front mounting channel 120 equal to such predetermined distance without deforming the top plate 102.

Referring to FIGS. 7, 10 and 11, a rear mounting assembly 200A is provided for attaching the rear top support 170 of the pedestal 150 to the rear mounting channel 126 attached to the undersurface of the desk top 101. The rear mounting assembly 200A comprises essentially the same nuts 201 and 230 and washer 210 previously described with respect to the front mounting assembly 200 and are labeled with the same reference numerals. In the interest of brevity, these parts will not be further described. The rear fastener, however, has a different construction for reasons to be explained presently and is labeled 220A, which fastener comprises a spacer portion 221A and oppositely extending threaded shanks 224A and 225A integral therewith. The shank 225A extends through the opening 174 on the embossment 173 of the top rear support 170. Disposed between the nut 230 and the embossment 173 is an annular washer 240 having an opening therein which receives the shank 225A.

For the sake of appearance, it is desirable that the top rear flange 154 of the pedestal 150 engage the bottom flange 107 of the edging 103 of the desk top 101. To prevent deforming of the embossment 173 on the rear top support 170 and of the retaining flanges 129 on the rear mounting channel 162, it is required that the embossment 173 be maintained a predetermined distance from the rear mounting channel 126 when the rear mounting assembly 200A is tightened. To this end, the thickness of the spacer portion 221A of the rear fastener 220A plus the thickness of the washer 210 is selected to be equal to such predetermined distance, whereby the top rear flange 154 of the pedestal 150 can engage the bottom flange 107 on the desk top 101 without deforming the embossment 173 or the retaining flanges 129. It should be noted that the rear spacer portion 221A has an axial length greater than that of the front spacer portion 221A, in order to compensate for the difference in relative heights of the top of the front frame 160 and the rear top support 170.

It should be noted that there are two openings 187 in the front frame 160 and two openings 174 in the rear top support 170. Accordingly, there is provided an additional front mounting assembly and an additional rear mounting assembly. In attaching the pedestal 150 to the desk top 101, the desk top is positioned top side down such that the mounting channels 120 and 126 are accessible to the workman. The washer 210 is slipped onto the upwardly extending threaded shank 224 of the fastener 220 and the nut 201 is then rotated thereon. The nut 201 is then positioned such that its longer sides 202 are parallel to the retaining flanges of the associated mounting channels 102 and 126. The nuts 201 are then installed in the associated mounting channels, the relative positions of which nuts are fixed by the use of a template accompanying the unassembled desk. The fastener 220 is then rotated by using a tool positioned in the recess 226 in the downwardly extending shank 225 (or 225A as the case may be) or by using a wrench or the like which engages the gripping surface formed by the hexagonal shape of the spacer portion 221 (or 221A, as the case may be). When the corners 205 of the nut 201 engage the sidewalls of the associated mounting channels 120 and 126, further rotation of the nut 201 is precluded and the nut 201 and the washer 210 are drawn against the opposing surfaces of the retaining flanges of the associated mounting channels 120 and 126. Further, engagement of the corners 205 with the sidewalls of the associated mounting channels causes the abutment surfaces 207 of the nut 201 to be naturally aligned with the edges of the retaining flanges of the associated mounting channels 120 and 126. In order that the washer 210 can be constructed of relatively lightweight material, it is important that it contact a substantial area of the retaining flanges 123 of the mounting channel 120. Consequently, it is important to position the washer 210 such that the abutment surfaces 214 and 215 thereof extend between the edges of the retaining flanges of the associated mounting channels 120 and 126.

The pedestal 150 is inverted and the opening 187 in the front frame 160 are positioned to receive the downwardly extending shanks 225 of the front mounting assemblies 200. The shanks 225A of the rear mounting assemblies 200A are passed through the openings 174 in the embossments 173 of the rear top support 170. The washers 240 are then positioned on the lower surface of the embossments 173, with the shanks 225A of the rear mounting assemblies 200A extending through the washers. The nuts 230 are than rotated onto the shanks 225 and 225A of the front and rear mounting assemblies 200 and 200A and tightened.

Because of the tolerances in manufacture of the pedestal 150 and the desk top 101, or in the placement of these components, it is desirable that the pedestal 150 be movable during the assembly procedure in order to align it with the left-hand (as viewed in FIG. 1) edge 103 of the desk top 101. To this end, the respective mounting assemblies 200 and 200A are loosened by rotating the nuts 230 followed by rotating the shanks 224 and 225 (or 224A and 225A, as the case may be) by utilizing the recess 226 in each shank, as previously explained. This disengages the nut 201 and the washer 210 from the retaining flanges of the associated mounting channels 120 and 126. By limiting rotation of the shanks 224 and 225 to for example one-fourth or one-half turn, the abutment surfaces 207 of the nut 201 and the abutment surfaces 214 and 215 of the washer 210 remain disposed between the inner edges of the retaining flanges of the associated mounting channels 120 and 126 as the pedestal 150 is moved therealong. Accordingly, the desired orientations of the nut 201 and the washer 210 are preserved so that they continue to contact maximum areas of the associated retaining flanges. When the final position of the pedestal 150 is selected, the shanks 224 and 225 (224A and 225A, as the case may be) are rotated by utilizing a tool inserted in the recess 226 to draw the nut 201 and the washer 210 tightly against the retaining flanges of the associated mounting channels. The nuts 230 are then tightened to draw the pedestal 150 against the spacer portions 221 and 221A.

While there has been described what is at present considered to be the preferred embodiment of the invention, it will be understood that various modifications may be made therein, and it is intended to cover in the appended claims all such modifications as fall within the true spirit and scope of the invention.

We claim:

1. In a desk construction having a desk top, parallel front and rear mounting channels secured to the undersurface thereof and each including a pair of downwardly extending sidewalls having a pair of inwardly directed retaining flanges disposed on the lower edges thereof, a pedestal having a front frame adjacent to the forward end thereof and a rear top support adjacent to the rear end thereof, the combination comprising a front mounting assembly for attaching the front frame to the front mounting channel, and spaced a first predetermined distance therefrom, a rear mounting assembly for attaching the rear top support to the rear mounting channel, and spaced a second predetermined distance therefrom, each of said mounting assemblies comprising a nut having a threaded opening therein and positioned in use on the upper surfaces of the associated retaining flanges, said nut having a pair of substantially parallel shorter sides and a pair of substantially parallel longer sides spaced apart by a distance less than the distance between the inner edges of the retaining flanges of the associated channel to permit insertion of said nut at any place therealong, a pair of downwardly projecting first abutment surfaces on said nut and spaced apart a distance slightly less than the distance between the inner edges of the retaining flanges of the associated channel to permit said first abutment surfaces to be disposed therebetween in an operative position for limiting rotation of said nut with respect to the associated mounting channel, a washer having an aperture therein and having a first predetermined thickness and positioned in use against the lower surfaces of the retaining flanges of the associated channel with said aperture in alignment with said opening, a pair of upwardly projecting second abutment surfaces on said washer and spaced apart a distance slightly less than the distance between the inner edges of the retaining flanges, of the associated channel to permit said second abutment surfaces to be disposed therebetween in an operative position for limiting rotation of said washer with respect to the associated mounting channel, a fastener including a spacer portion and a threaded shank extending from said spacer portion and positioned in use through said aperture and engaging in said opening, said spacer portion having a pair of engagement surfaces disposed substantially normal to the axis of said shank and spaced apart to provide a second predetermined thickness, the sum of said first and second predetermined thicknesses respectively of said washer and said spacer portion in said front mounting assembly being equal to the first predetermined distance between the front frame and the front mounting channel, the sum of said first and second predetermined thicknesses respectively of said washer and said spacer portion in said rear mounting assembly being equal to the second predetermined distance between the rear top support and the rear mounting channel, and attachment means respectively engaging said fasteners for holding the front frame and the rear top support respectively against the lower one of the engagement surfaces of the associated ones of said spacer portions, said first and second abutment surfaces retaining said nut and said washer oriented in the operative positions thereof with respect to the associated channels when said fastener is loosened with respect to said nut, thus to permit adjustment of the pedestal along the channels while maintaining said nut and said washer in the operative positions thereof.

2. The mounting assemblies set forth in claim 1, wherein said fastener further includes a second threaded shank extending from said spacer portion and directed oppositely to said first-mentioned threaded shank, and said attachment means comprises a second nut with a threaded opening to engage said second shank.

3. The mounting assemblies set forth in claim 2, wherein the front frame of the pedestal has an opening therein for receiving said second shank of said front mounting assembly, and the rear top support of the pedestal has an upwardly extending embossment provided with an opening therein for receiving said second shank of said rear mounting assembly.

4. The mounting assemblies set forth in claim 2, wherein said rear mounting assembly further includes a second washer having a hole therein for receiving said second shank, said second washer being positioned in use between the top rear support and said second nut in said rear mounting assembly.